United States Patent
Matteucci et al.

(10) Patent No.: US 6,490,526 B2
(45) Date of Patent: Dec. 3, 2002

(54) METHOD FOR CHARACTERIZATION OF MULTI-SCALE GEOMETRIC ATTRIBUTES

(75) Inventors: Gianni Matteucci, Houston, TX (US); Daniel H. Cassiani, Spring, TX (US); Larry E. Ives, Missouri City, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 90 days.

(21) Appl. No.: 09/803,443

(22) Filed: Mar. 9, 2001

(65) Prior Publication Data

US 2002/0035443 A1 Mar. 21, 2002

Related U.S. Application Data

(60) Provisional application No. 60/190,855, filed on Mar. 20, 2000.

(51) Int. Cl.$^7$ ................................................. G01V 1/28
(52) U.S. Cl. ............................................. 702/5; 702/16
(58) Field of Search ........................ 367/41, 72; 702/2, 702/5, 6, 11, 14, 16, 17

(56) References Cited

U.S. PATENT DOCUMENTS

| | | | |
|---|---|---|---|
| 5,848,379 A | 12/1998 | Bishop | 702/6 |
| 5,892,732 A | * 4/1999 | Gersztenkorn | 367/72 |
| 5,930,730 A | 7/1999 | Marfurt et al. | 702/16 |
| 5,986,974 A | 11/1999 | Luo et al. | 367/41 |
| 6,131,071 A | 10/2000 | Partyka et al. | 702/16 |

OTHER PUBLICATIONS

Stewart, S. A. et al. "Curvature Analysis of Gridded Geologic Surfaces", In: Coward, M.P., Daltaban, T.S. & Johnson, H. (eds) "Structural Geology in Reservoir Characterization". Geological Society, London, Special Publications, 127 (1998) pp. 133–147.

Lisle, Richard J.; "Detection of Zones of Abnormal Strains in Structures Using Gaussian Curvature Analysis," AAPG Bulletin No. 78 (1994) pp. 1811–1819.

Padgett, M.J. et al., "Fracture Evaluation of Block P–0315, Point Arguello Field, Offshore California, Using Core, Outcrop, Seismic Data and Curved Space Analysis," 1st AAPG SPE et al. Conference, Houston, Texas (1991) pp. 242–268.

Luthy, S. T. et al., "Three Dimensional Geologic Modeling of a Fractured Reservoir, Saudi Arabia," SPE 29814, 9th SPE Middle East Oil Show, Bahrain (1995) pp. 419–430.

Lisle, R. J. et al., "The Mohr Circle for Curvature and its Application to Fold Description," Journal of Structural Geology, vol. 17, No. 5. (1995) pp. 739–750.

Coscia, C; Marlin, C;"An Expert System For Locating And Identifying Geological Faults"; Proceedings of the Australian Joint Conference on Artificial Intelligence; 1990; pp 537–550.*

* cited by examiner

Primary Examiner—John S. Hilten
Assistant Examiner—Douglas N Washburn
(74) Attorney, Agent, or Firm—Charles R. Schweppe

(57) ABSTRACT

A multi-trace geometric attribute of a regularly gridded surface is calculated at multiple scales, wherein, first, a window size is selected. Next, a set of the grid points is defined defining grid cells of the selected window size. Next, the geometric attribute is calculated using the traces at the set of the grid points. Next, the above selecting and calculating steps are repeated for sets of the grid points defining grid cells of different window sizes. Finally, the window size is determined whose calculations best represent the geometric attribute.

8 Claims, 11 Drawing Sheets

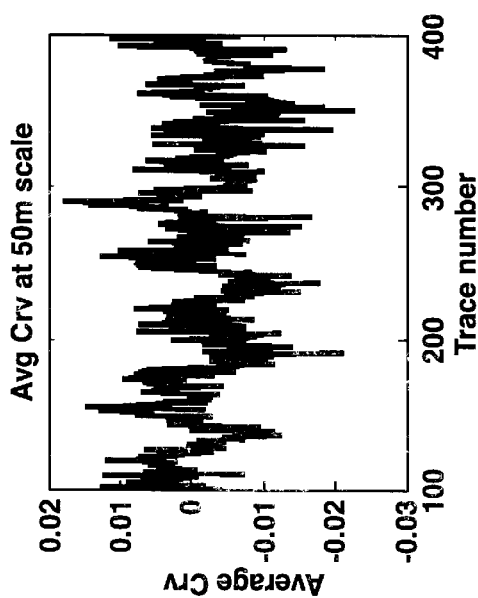
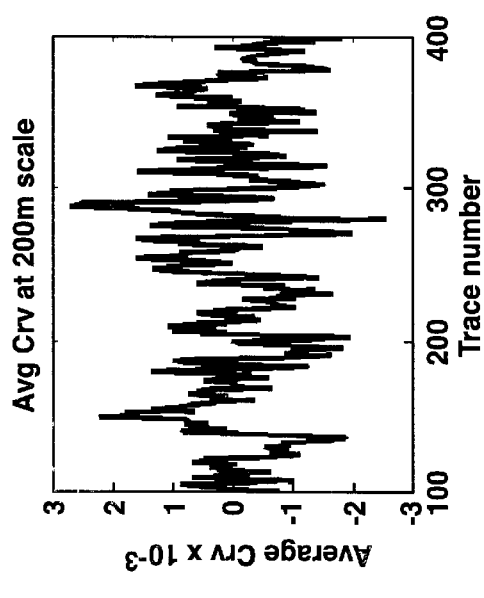
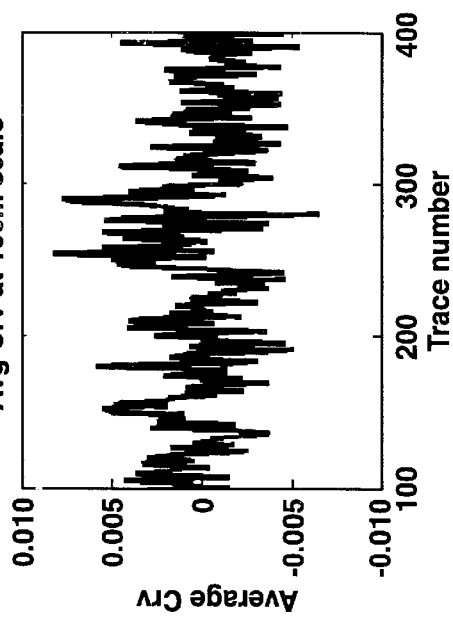
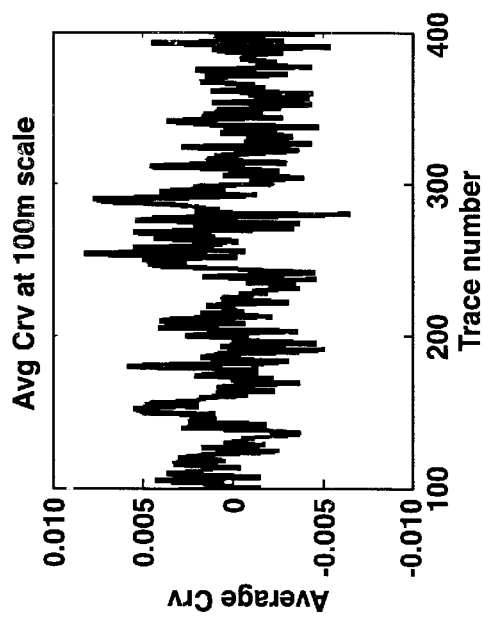
FIG. 5A
FIG. 5B
FIG. 5C
FIG. 5D

METHOD FOR CHARACTERIZATION OF MULTI-SCALE GEOMETRIC ATTRIBUTES

This application claims the benefit of U.S. Provisional Application No. 60/190,855 filed on Mar. 20, 2000.

FIELD OF THE INVENTION

This invention relates generally to the field of geophysical prospecting. More particularly, the invention relates to the field of characterization of seismic attributes. Specifically, the invention is a method for the characterization of dip, curvature, moundness or rugosity of gridded surfaces for the quantitative estimation of reservoir facies and reservoir properties.

BACKGROUND OF THE INVENTION

In many geologic basins the detailed identification of faults, folds, and the degree of moundness or rugosity of a surface can be extremely useful in seismic reservoir characterization and in the development of reservoir models for fluid flow simulations. For example, faults, folds, and fractures may profoundly affect reservoir characteristics such as the producibility of oil and gas wells. Small fault planes can be resolved by seismic 3-D surveys of reasonable quality. It is well known that the folding of strata may result in the development of fractures and faults on a variety of scales. Mounding may result as differential compaction of sediments with different concentrations of sands and shales. Mounding may also highlight locations of reef structures.

One of the biggest problems when dealing with fractured or mounded reservoirs is the recognition of the most typical scale at which these features occur. The imaging of the top of a reservoir at some typical or dominant scale should bring out the most interesting geometric, topographic, or morphological character of the surface. This would provide separation of the small-scale random fluctuations from the coherent portion of the signal. In seismic acquisition, the former could be processing or interpretation noise, while the latter could be the geologic footprint A common measure of fault-related and fold-related deformation is to calculate the structural dip, namely, the magnitude of the gradient of the depth of an interpreted seismic horizon. Another common measure of fold-related deformation is structural curvature, which is derived from the second spatial derivatives of a depth surface. Curvature can also be used to measure the moundness or rugosity of a surface. The rugosity of a surface may be an indication of stratigraphic facies (e.g. channel's levees) rather than of structural control. Dip and curvature can be defined as geometric multi-trace attributes because their definitions require the availability of depth measurements at multiple trace locations and because they truly characterize the geometric characteristics of a surface. Dip and curvature maps define areas of steep slope and of significant bending.

The calculations of multi-trace attributes are usually performed at the highest spatial resolution afforded by the data. Unfortunately, the pervasive presence of distortions in the seismic data (local noise, and its effects on seismic interpretation) can affect the detection of features by failing to identify larger trends. Smoothing and re-gridding of the initial surface are commonly employed to provide attribute maps at different spatial scales. These maps are then used to analyze the regional and local structural and stratigraphic facies. However, the smoothing and re-gridding are often applied subjectively and with a corresponding loss of resolution.

Current technology relies heavily on 3-D seismic data for delineation of faults and depositional environments. However, the process usually involves gridding of the surface output from the 3-D data and the filtering out of its high-resolution component. Current commercial implementations of these types of geometric attributes require smoothing or re-gridding of the data and specifically several intermediate and often subjective manipulations of the data.

Most vendor software packages (e.g., ARC/Info, ZMap) calculate geometric attributes using first and second derivatives along two orthogonal directions, and then sum up their contributions to arrive to an approximate value of Dip and Curvature. The calculations of such geometric attributes at greater spatial scales require the re-gridding of the surface to a coarser grid (bigger cell size). Invoking several smoothing passes usually minimizes noise in the map appearance. These vendor applications are more suited for calculation of such attributes on conventional 2-D seismic data where the more sparse and irregular data must be gridded for analysis and the coarseness of the 2-D seismic coverage lends itself to such gridding. Maps constructed from 3-D data using these vendor applications often need to be gridded and smoothed significantly in order to see geological features. Much detail and resolution are lost. Gridding at small bin size, close to the actual trace spacing, results in surface attributes that are often overwhelmed by noise and offer a very narrow range of values. Geometric attribute maps appear meaningless, often with no apparent discernible pattern. Manipulations of the color scale do not show any improvement.

Stewart S. A. and Podolski R. (1998), "Curvature analysis of gridded geologic surfaces", Coward M. P., Daltaban T. S. and Johnson H. (eds.), *Structural Geology in Reservoir Characterization,* Geological Society of London, Special Publications, 127, 133–147, discuss how dip and grid lattice orientation affect the resulting estimates of the true surface curvature, thus stressing the approximations provided by common vendor packages. However, they fail to recognize the interdependencies of the various measures of curvature as they focus on the determination of the principal curvatures. Their main recommendations involve careful gridding, smoothing (despiking), and calculations at many offsets and at multiple orientations. Such steps are not necessary, as knowledge of the Gaussian and Average curvatures is sufficient to determine the principal curvatures. Detailed time consuming calculations of curvature along multiple orientations are not necessary.

Lisle R. J. (1994), "Detection of zones of abnormal strains in structures using Gaussian Curvature Analysis", *AAPG Bulletin,* 78,1811–1819, follows a similar procedure, as indicated by its selection of the neighboring points for estimating $K_G$. Specifically, it uses smoothing and contouring before the calculation of curvature. The method does not yield the principal curvatures and the corresponding principal axes. There is also no mention on how to deal with noisy data. The implicit assumption is that the smoothing and contouring takes care of such situations.

Generally, the published papers describing the geological applications of curvature give an incomplete treatment of the interdependencies of its various measures. They mostly focus on Gaussian curvature or discuss the azimuthal dependency of the principal curvatures. One issue that is often avoided is the recognition of the difficulty of applying the mathematical concepts when dealing with gridded, noisy data. This is treated in Padgett M. J. and Nester D. C, (1991), "Fracture evaluation of Block P-0315, Point Arguello Field, offshore California, using core, outcrop, seismic data and curved space analysis", 1st AAPG SPE et al Conference, Houston, Tex., 242–268; and Luthy S. T. and Grover G. A., (1995), "Three-dimensional geologic modeling of a fractured reservoir, Saudi Arabia", 9th SPE Middle East Oil Show, Bahrain, 419–430. The concept of the scale of the features under analysis is also often avoided, thus failing to recognize the existence of an optimal, data-determined scale giving the best-focused images.

Stewart and Podolski (1998) give the most complete treatment of the problem to date. They discuss 1) a moving window method, 2) the scale dependency of the results, 3) argue for multiple curvature extractions, 4) understand the effect of the inclusion of dip on the curvature calculations. However, they (1) focus on principal curvatures and normal curvature, (2) fail to recognize the importance of larger window sizes as a noise-reduction procedure, and (3) are swayed by the effect of aliasing when calculating curvatures along various orientations when such an approach is not necessary. Additionally, their paper describes critical issues in geometric attribute analysis without recommending any specific algorithm for calculating stable, robust geometric attributes as the present invention does.

The understanding of the solution of the problem came from theoretical and numerical analysis of synthetic surfaces, of various shapes and orientation, over which small-scale noise was added. None of the currently available vendor packages appears to be capable of providing all the various measures of curvature described above or the corresponding azimuths or principal axes with the detailed resolution achieved by the present invention.

Thus, there exists a need for an efficient method to apply such mathematical operations to attribute maps for quantitative seismic facies analysis or to stratigraphic horizons for the identification of moundness or rugosity of surfaces.

SUMMARY OF THE INVENTION

The present invention is a method for calculating a multi-trace geometric attribute of a regularly gridded surface at multiple scales. First, a window size is selected. Next, a set of the grid points is defined defining grid cells of the selected window size. Next, the geometric attribute is calculated using the traces at the set of the grid points. Next, the above selecting and calculating steps are repeated for sets of the grid points defining grid cells of different window sizes. Finally, the window size is determined whose calculations best represent the geometric attribute.

BRIEF DESCRIPTION OF THE DRAWINGS

The present invention and its advantages may be more easily understood by reference to the following detailed description and the attached drawings in which:

FIGS. 3(a) and 3(b) show window definition and grid point selection for a simple algorithm and for the present invention;

FIGS. 5(a)–5(d) show a structural cross section through FIG. 4 and the corresponding curvature plots for different window sizes;

While the invention will be described in connection with its preferred embodiments, it will be understood that the invention is not limited thereto. On the contrary, it is intended to cover all alternatives, modifications and equivalents that may be included within the spirit and scope of the invention, as defined by the appended claims.

DETAILED DESCRIPTION OF THE INVENTION

The present invention is a new technique for objectively calculating multi-trace geometric attributes, such as dip and curvature, of any gridded surface at multiple scales. Local and regional trends related to faulting (dip and azimuth maps) and folding or surface bending (various measures of curvature and the associated principal axes and principal directions) can be detected at a resolution far exceeding what is available in vendor packages. These surface attributes can be calculated rapidly and at negligible expense.

Figure 1:
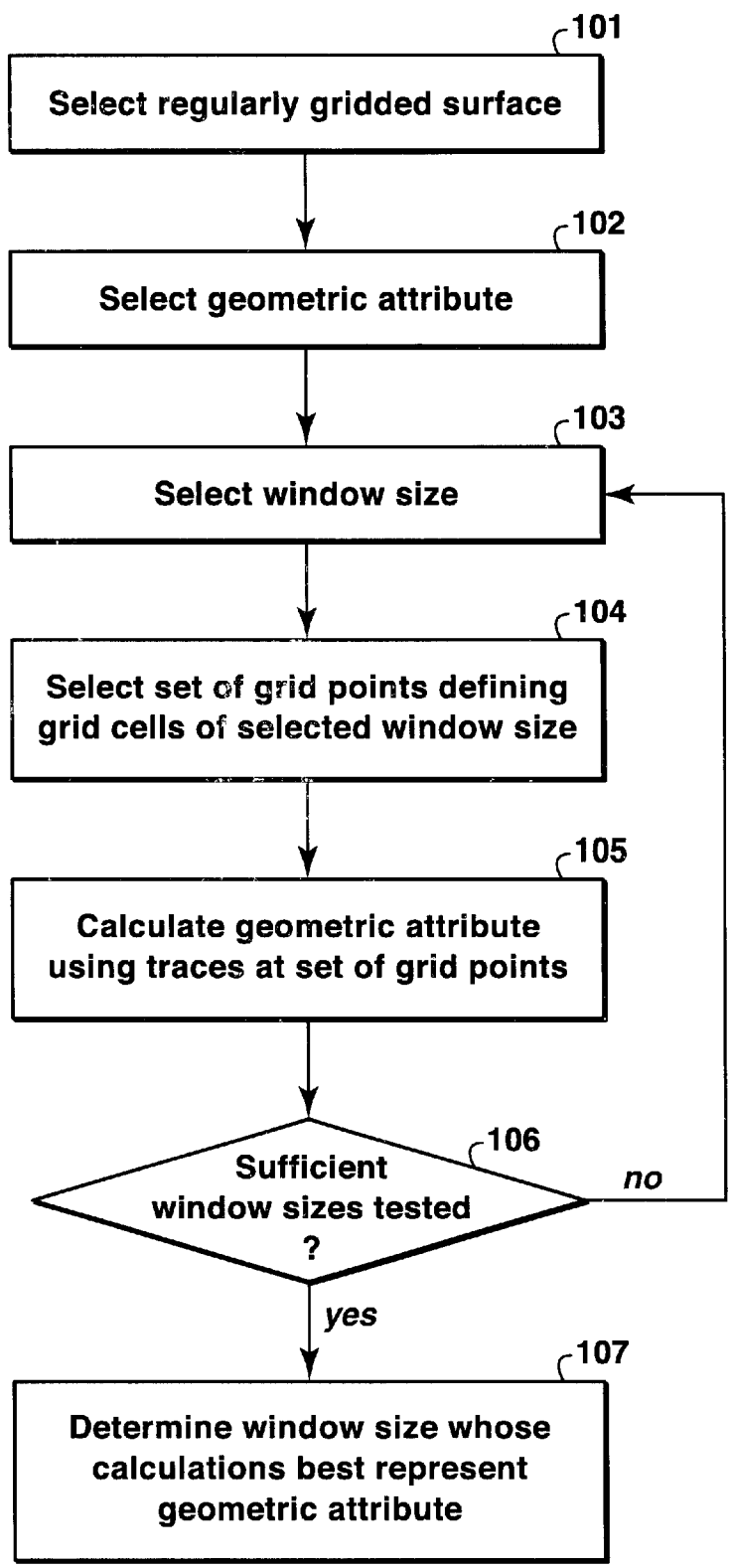
FIG. 1 is a flow chart illustrating the method of an embodiment of the present invention.

FIG. 1 is a flow chart illustrating the method of an embodiment of the present invention. First, in step 101, a regularly gridded surface is selected. Preferably, the grid points are given by the locations of the seismic traces in the raw data. Alternatively, the grid points are selected to give a minimal distance between seismic trace locations. Next, in step 102, a geometric attribute of interest is selected for examination on the selected surface of step 101. Preferable attributes are dip and curvature, although any geometric attribute that can be calculated at grid points may be used. Next, at step 103, an initial window size is selected. Typically, this would be the smallest size defined by the grid cells in the regular grid on the surface or an integer multiple of this. Next, at step 104, a set of grid points is selected which defines grid cells of the selected window size of step 103 throughout the gridded surface.

Next, at step 105, the geometric attribute of step 102 is calculated for each of the grid cells in the set of grid points of step 104. The attribute is calculated from the seismic traces located at the grid points. The calculation of the attribute can be thought of as an operator, filter, or kernel in which the proper weights are assigned to the seismic trace values at the locations given by the grid points. The assigned weights represent the contributions to the filter at the grid points. In particular, the calculation of dip or curvature attributes can be implemented as a convolutional operator or filter. The spatial derivatives in the calculation of dip or curvature are preferably calculated using standard finite difference approximations.

At step 106, it is determined whether a sufficient number of different window sizes have been tested to cover the possible range of scales of the geometric attribute. If the answer is no, then the process returns to step 103 to select another window size. Preferably, this window size is an integer multiple of the initial window size. If the answer is yes, then the process continues to final step 107. Here, the window size is determined whose calculations when displayed best represent the geometric attribute. This process characterizes the appropriate scale of the geometric attribute. This last step could be implemented using an adaptive filtering approach so that the data itself drive the selection of the appropriate scale.

Dip and curvature are geometrical properties of a surface calculated from their first and second spatial derivatives. However, issues related to grid spacing, smoothing, and the effects of ever-present noise in the data become very important when calculating derivatives. For example, mapped surfaces usually exist as grids, namely as discretized versions of the original surfaces. The concepts of gradient and curvature can be easily understood mathematically and physically when applied to smooth, continuous and simple surfaces. The application of such mathematical operators to complex, discretely sampled, noisy geologic surfaces is more challenging as the results may seem physically not plausible. It is well known in the art that the mathematical derivative of any multi-spectral signal (that is a signal composed of multiple frequencies such as sine and cosines with varying wavenumbers) is equivalent to a high-pass filter. The resulting signal contains significantly greater energy in the high frequency band (smaller scales). It is often assumed that noise in seismic data occurs at small spatial scales: the individual details on a trace-by-trace basis may be unreliable, but trends extending over several traces are inherently more reliable and geologically plausible. The implicit danger in calculating naively spatial derivatives is to boost the small-scale noise while hiding even more the coherent component of the signal. Dip and curvature maps thus appear noisier than the original map.

The present invention deals with these limitations by calculating geometric attributes for different data spacing, namely window sizes or kernel widths. From the seismic time structure map, depth map, or any other seismic attribute map the surface is regularized to a grid of equal bin size in both the inline and cross line directions. For each selection of a kernel width, the surface attributes are calculated and then displayed in map form and along any traverse path through the data. The procedure is performed for several kernel widths. In order to preserve the original resolution of the seismic data and to avoid subjectivity, the kernel widths available are restricted to be integer multiples of the original grid cell size. Thus, no smoothing or regridding of the data is performed. Rather a sliding kernel approach is used in which the one-dimensional or two-dimensional kernel slides systematically across the curve or surface, each time centered on a different seismic trace. The generation and visualization of curves or maps at different kernel widths (namely, at different spatial scales) is equivalent to the optical process of focusing on an object through a binocular. The settings are adjusted depending on the features of interest, just as the distance of an object from the observer determines the proper focussing length. The optimal setting occurs when most of the image is in focus.

One-Dimensional Dip and Curvature

Given a one-dimensional curve, it is denoted in parametric form as $$Z=f(x), \quad (1)$$

where Z is the height/depth and x is the horizontal coordinate. In practical applications Z can be the seismic two-way-time of an interpreted horizon (in ms) from a 2-D seismic line, or the depth (in feet or meters). The horizontal coordinate is usually expressed in CDP (Common Depth Point) number. The distance between any two traces is usually constant. For 3-D seismic surveys typical spacing range between 12.5 and 50 m (40 ft through 150 ft).

The dip or gradient of the curve is defined by its first spatial derivative. Mathematically, $$\text{Dip}=df/dx=dZ/dx=tg\alpha \quad (2)$$

Notice that the dip is taken along the line direction. If Z is expressed in meters or feet, and the distance along the line is also expressed in meters or feet, then the dip is a non-dimensional quantity. Specifically, from trigonometry, the dip expresses the angle $\alpha$ of the line tangent to the curve with the horizontal. Large dips imply rapid changes in depth.

The curvature of an arc of a curve is defined as the ratio between the angle ($d\alpha$) of the two lines tangent to the end-points of the arc, and the length of the arc ($ds$). It expresses the rate of change in the dip. Mathematically, $$K=d\alpha/ds \quad (3)$$

or $$K=(+/-)f_{xx}/(1+f_x^2)^{3/2} \quad (4)$$

Where $f_x=df/dx=dZ/dx$, and $f_{xx}=d^2f/dx^2=d^2Z/dx^2$ are the first and second spatial derivatives, respectively.

The convex portions of the curve take the negative sign, while the positive sign belongs to the concave portions (for a derivation see Aleksandrov et al., 1963). Thus, positive curvature implies convexity, while negative curvature implies concavity. The reciprocal of the curvature is called the radius of curvature $R=1/K$. For a straight line the curvature is zero, and the radius of curvature is infinite. Conversely, for a circle the radius of curvature anywhere along the circle is equal to its radius, and its curvature is $K=1/R$. Notice that if Z and x are in the same physical unit of meters, then the physical unit of K is in 1/meters, and R is in meters. If Z is in seismic travel time such physical conversion is invalid and K and R are in mixed units. Notice that in Eq. (4) curvature is calculated in the direction of the seismic line. However, K depends on the dip of the surface, as denoted by d Z/dx. Therefore, in geological applications, if the tectonic dip is non-zero, the curvature will differ significantly from the second derivative of the depth contour.

Figure 2A:
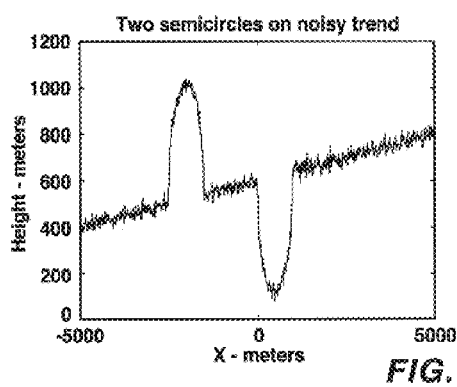
FIGS. 2(a)–2(d) show a simple two bump 1-D model of a curve with added noise and the corresponding curvature plots for different window sizes.
Figure 2B:
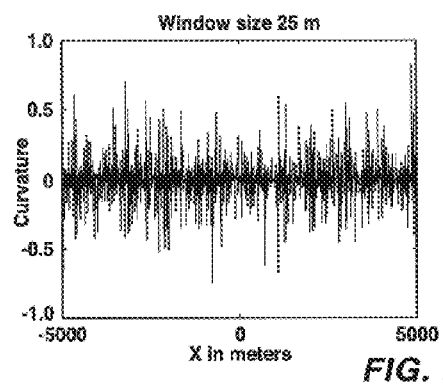
Figure 2C:
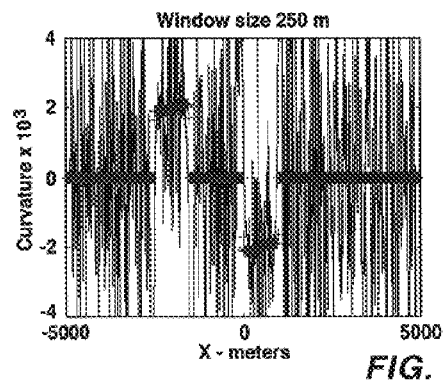
Figure 2D:
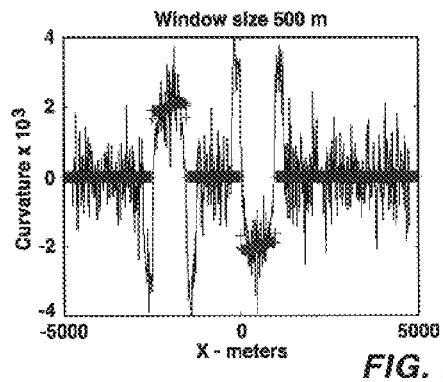

In the absence of any noise, numerical experiments on a variety of curves confirm the physical interpretation of these concepts. FIGS. 2(a)–2(d) illustrate a simple example. FIGS. 2(a)–2(d) show a simple two bump 1-D model of a curve with added noise and the corresponding curvature plots for different window sizes. FIG. 2(a) is an example of two semicircles of radius R=500 m superimposed on a dipping horizon. The grid point distance is 12.5 m. Random white Gaussian noise of 20-m average amplitude has been superimposed to illustrate the performance of the present invention. FIG. 2(b) shows that the naive determination of curvature with a 25-m window size does not display any trend. FIG. 2(c) shows that curvature calculated at 250 m window size is still quite noisy. However, the occurrence of two trends with about K=0.002 m$^{-1}$ (R=1/K=500 m) centered in correspondence of the centers of the semicircles is now noticeable. The thick curve indicates the actual value of curvature for the smooth, noise-free version of the signal. The numerical estimate matches the theoretical value. FIG. 2(d) is as in FIG. 2(c) but for a 500 m window size. The trends are now quite visible. Changes in the window size (kernel size) reveal the trends otherwise obscured by the small-scale noise. Smallest window sizes identify mostly incoherent noise. The optimal window size identifies the correct geometrical extent of the features. The numerical values of the curvature determined in the above fashion can now be linked with greater confidence to the geological reservoir properties related to the bending and folding of surfaces.

In terms of the physical meaning of curvature, Aleksandrov et al. (1963) showed that the pressure at each point of a string is directly proportional to string tension and to curvature. Tension and strain are related to fold curvature and thence to the probable development of fractures (Price and Cosgrove, 1990, as quoted by Stewart and Podolski, 1998, Luthy and Grover, 1995).

Two-Dimensional Curvature

In parametric form, a two-dimensional surface is defined as $$Z=f(x,y) \quad (5)$$

where Z is the depth of an interpreted seismic horizon, and x and y are the horizontal coordinates of the seismic grid (along the inline and cross line directions). Z is usually in seismic traveltime or depth, x and y are in units of feet or meters. Typically, seismic bin spacing is between 12.5 m and 25 m, with some gridding required at times to homogenize uneven spacing along inlines and crosslines.

The dip at any given point is given by the rate of change of the height/depth of the surface. The steepness of the surface may change depending on the direction. The gradient of a surface is the maximum rate of change in slope; namely, it is the dip along the directions of maximum change. Such direction is called the azimuth.

Mathematically, $$\text{Gradient}=\sqrt{[(\partial f/\partial x)^2+(\partial f/\partial y)^2]} \quad (6)$$

while the azimuth, or angle $\phi$ with the East-West direction, is given by $$\phi=\arctg\,[(\partial f/\partial y)/(\partial f/\partial x)] \quad (7)$$

The curvature of a surface at any given point is given by the rate at which the surface leaves its tangent plane (Aleksandrov et al., 1963). But the surface may leave such plane at different rates in different directions. Curvature thus expresses the bending of a surface. The mathematical definition and derivation of the curvature of a surface require careful understanding of differential geometry. Refer to Smirnov (1977) and Aleksandrov et al. (1963) for details. There are several measures of curvature of a surface. For example, in structural analysis the normal curvature, $K_n$, the principal curvatures $K_1$ and $K_2$, and the Gaussian curvature $K_G$ are often quoted (Padgett and Nester, 1991, Lisle, 1994, Lisle and Robinson, 1995, Stewart and Podolski, 1998). Average curvature $K_A$ is also used in differential geometry. These mathematical quantities are not all independent. Indeed they can be all calculated using expressions involving first and second spatial derivatives of the surface Z. Below, the essential definitions are given.

$$K_G=(f_{xx}f_{yy}-f_{xy}^2)/(1+f_x^2+f_y^2)^2 \quad (8)$$

$$K_A[(1+f_x^2)f_{yy}-2f_xf_yf_{xy}+(1+f_y^2)f_{xx}]/[2(1+f_x^2+f_y^2)^{3/2}] \quad (9)$$

where $f_x=\partial f/\partial x$; $f_y=\partial f/\partial y$, $f_{xx}=\partial^2 f/\partial x^2$, $f_{yy}=\partial^2 f/\partial y^2$, $f_{xy}=f_{yx}=\partial^2 f/\partial x\partial y$, are the first and second order spatial derivatives.

The Gaussian curvature $K_G$ is the product of the principal curvatures $$K_G=K_1K_2=1/(R_1R_2.) \quad (10)$$

The Average curvature $K_A$ is the average of the principal curvatures $$K_A=(K_1+K_2)/2=(1/R_1+1/R_2)/2 \quad (11).$$

For $K_G>0$ the surface looks like a bowl like the exterior or interior of a sphere (depending of the actual signs of the principal curvatures). When $K_1$ and $K_2$ have different signs, the surface looks like a saddle. For $K_A>0$ the surface has the form of a bowl (a convex one if $K_1$ and $K_2$ are both positive), of a ridge, or of a saddle depending on the magnitude of the principal curvatures. Locally flat surfaces yield zero Gaussian and average curvature. Average curvature and Gaussian curvature are often used in the theory of surfaces, rather than the principal curvatures.

In terms of the physical meaning of these quantities, Aleksandrov et al. (1963) showed that, from mechanical considerations, the pressure at a given point of a surface is directly proportional to the tension on such surface and to the average curvature at such point. The dominance of concavity or convexity of the surface along the principal directions determines the sign of the average curvature. Gaussian curvature instead is related to the degree of divergence of lines perpendicular to the surface. The greater the $K_G$, the greater is the bending of the surface. The absolute value of $K_G$, a quantity occasionally used in structural analysis, gives the degree of curvature of the surface in general. Mathematically, the different values of $K_G$ do not imply any stretching or tearing of the surface (the process associated with expressing the fracturing likelihood in the geological discussions of structural curvature). Problems arise, however, when surfaces assume complicated shapes, see discussion in Stewart and Podolski (1998). Specifically the signs of the Average and Gaussian curvature determine whether the surfaces are concave, convex, or mixed depending on the direction of analysis.

The principal curvatures $K_1$ and $K_2$ are defined as the curvatures along two mutually perpendicular directions. The curvatures of the normal sections along such directions are the smallest and largest values of the curvatures of all normal sections. For example, for a sphere $K_1=K_2=1/R$ where R is the radius of the sphere. $K_1$ and $K_2$ can be determined directly in terms of $K_A$ and $K_G$:

$$K_1=K_A-\sqrt{(K_A^2-K_G)} \quad (12)$$

$$K_2=K_A+\sqrt{(K_A^2-K_G)} \quad (13)$$

$K_1$ and $K_2$ can be thought of as the major and minor axes of the local ellipsoidal curvature. The principal directions can also be determined directly from expressions involving spatial derivatives of the surface $$\phi_1=\arctg[(-b-\sqrt{(b^2-4ac)})/2a] \quad (14)$$

$$\phi_2=\arctg[(-b+\sqrt{(b^2-4ac)})/2a] \quad (15)$$

where $a=f_xf_yf_{yy}-(1+f_y^2)f_{xy}$, $b=(1+f_x^2)f_{yy}-(1+f_y^2)f_{xx}$ and $c=(1+f_x^2)f_{xy}-f_xf_yf_{xx}$.

The normal curvature $K_n$ is the curvature of a normal section rotated by the angle $\phi$ to the axis of the principal curvatures, $$K_n=K_1\cos^2\phi+K_2\sin^2\phi. \quad (16)$$

The best application of the above concepts and formulas is for two-dimensional surfaces derived from seismic interpretation.

Typically, this includes
1) structure maps, namely seismic time surfaces corresponding to a specific geologic marker,
2) depth maps, obtained by converting to depth the interpreted seismic travel time, or
3) seismic attribute maps, that is maps of attributes (e.g. seismic amplitude) thought to be related to depositional facies, reservoir facies, or reservoir properties.

The outcome of the geometrical attribute analysis on such surfaces/maps is their objective topographic or morphological characterization, namely a quantitative estimate of their spatial segmentation. This amounts to a new type of seismic facies analysis that can be quantitatively linked to the estimation of reservoir properties.

Figures 3A, 3B:
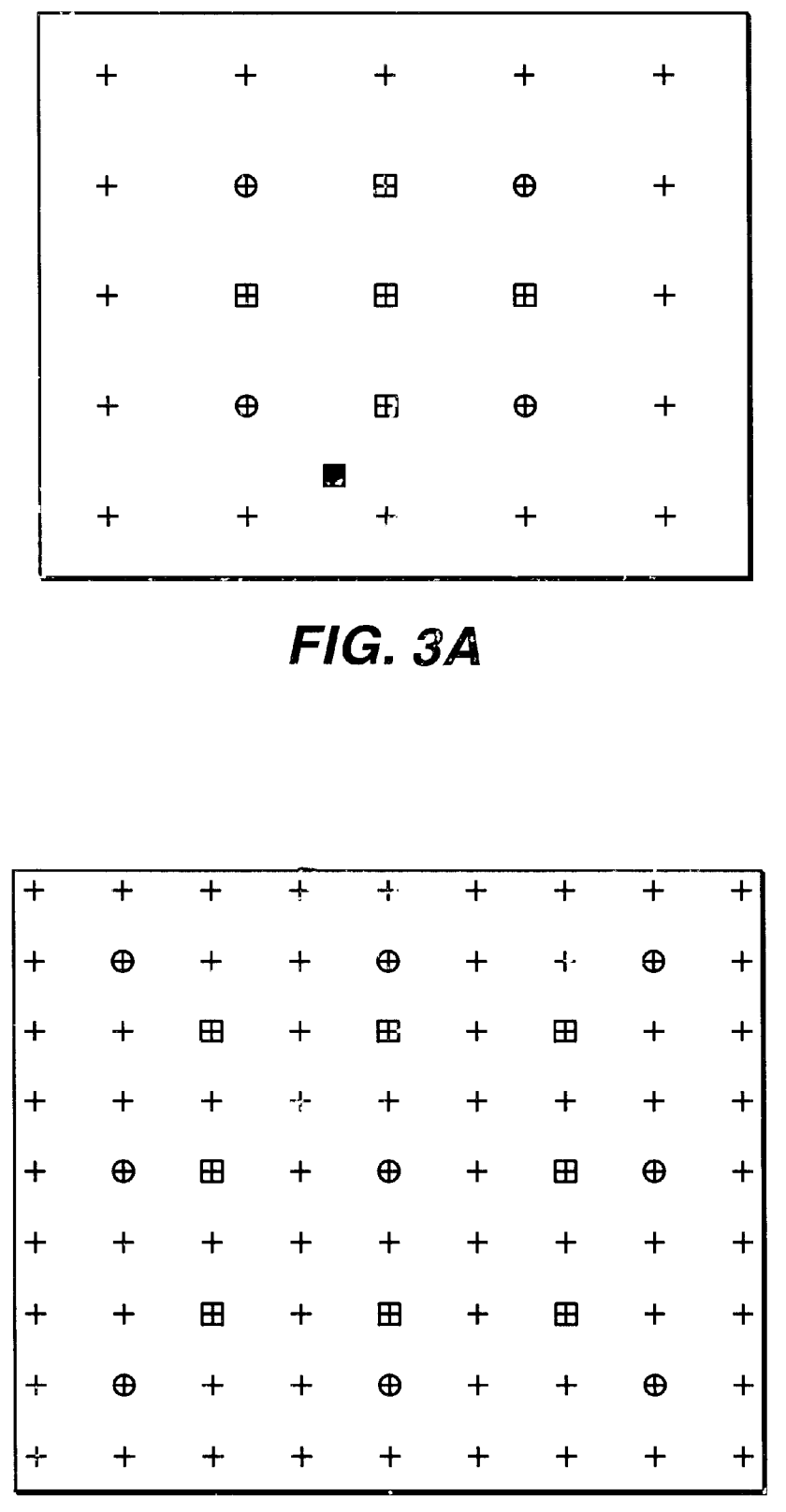

In two-dimensional applications, the present invention preferably uses Eqs. (6)–(7) and (12)–(16) to calculate the multi-scale geometric attributes of dip and curvature. The spatial derivatives are calculated using standard finite difference approximations. Alternatively, the calculations could follow a convolutional or an operator approach. In general, this is a filter with weights determined by the selection of the window size. FIGS. 3(a) and 3(b) show window definition and grid point selection for a simple algorithm and for the present invention. In the simplest naive form, dip can be calculated by choosing a reference location and the 4 grid points located just left, right, above and below it. Similarly, curvature calculations require the same 4 points plus the 4 extra points along the two diagonals. In summary, a total of 5 grid points are required for calculating dip, and 9 grid points for calculating curvature. The calculations can be repeated choosing any other location until all points in the original lattice are associated with corresponding values of the attributes. This is called the moving or sliding window approach. The kernel width (window size) here is the same along either direction, that is, a square window is used. FIG. 3(a) is a grid lattice illustrating the grid points employed for the calculation of geometric attributes. The grid point distance is assumed to be 12.5 m. Grid points are indicated with a plus sign. The grid points surrounded by circles and squares are those used in the calculations. For the simplest naive algorithm, the smallest window resolution of 25 m would be used.

In the present invention, these geometric attributes can be calculated at various spatial scales by altering the selection of the grid points. Instead of selecting the closest 8 points (notice how they are located on the perimeter of the square centered at the reference point), the next set of 8 points (still on the perimeter of a square, but this time of twice the size) is selected. The size of the square window determines the scale at which to calculate the attributes. The size of the square is extended only by finite multiples of the original grid. FIG. 3(b) illustrates the concept graphically. FIG. 3(b) shows the grid point selection for selected larger window sizes, as used in the present invention. The grid points surrounded by squares identify a 50-m window size, those by circles a 75-m window size. The reference point is always in the center of the square.

In the case of a seismic grid with equal spacing along the inline and cross line directions, these geometric attributes are always registered at the original seismic trace locations. The overlapping of the moving window maintains the seismic resolution while visualizing the trends exhibited by the selection of the proper window size. The present invention can use more fully the detailed structural and stratigraphic information provided by 3-D seismic surveys. Also, by selecting large window sizes, the information provided by 3-D surveys can be homogenized with that afforded by earlier sets of 2-D seismic lines.

The special arrangement of grid points from the grid lattice that is selected allows the determination of the effect of long trends in the data on the characterization of the steepness and bending of the surface. No smoothing or regridding of the data is involved. The algorithm allows the observation of whatever trend occurs in the data by investigating the sensitivity of the attribute calculations to the size of the window of analysis. The net effect is in a reduction of small scale, often random, fluctuations which overwhelm and obscure the appearance of larger trends in the dip and curvature of the surface. This is clearly seen in FIGS. 2(a)–2(d) for the one-dimensional case. FIGS. 4–12 illustrate the applications of the concepts for practical two-dimensional cases. FIGS. 4–8 deal with a structural example, while FIGS. 9–12 deal with a stratigraphic example with mounded channels.

EXAMPLES

Figure 4:
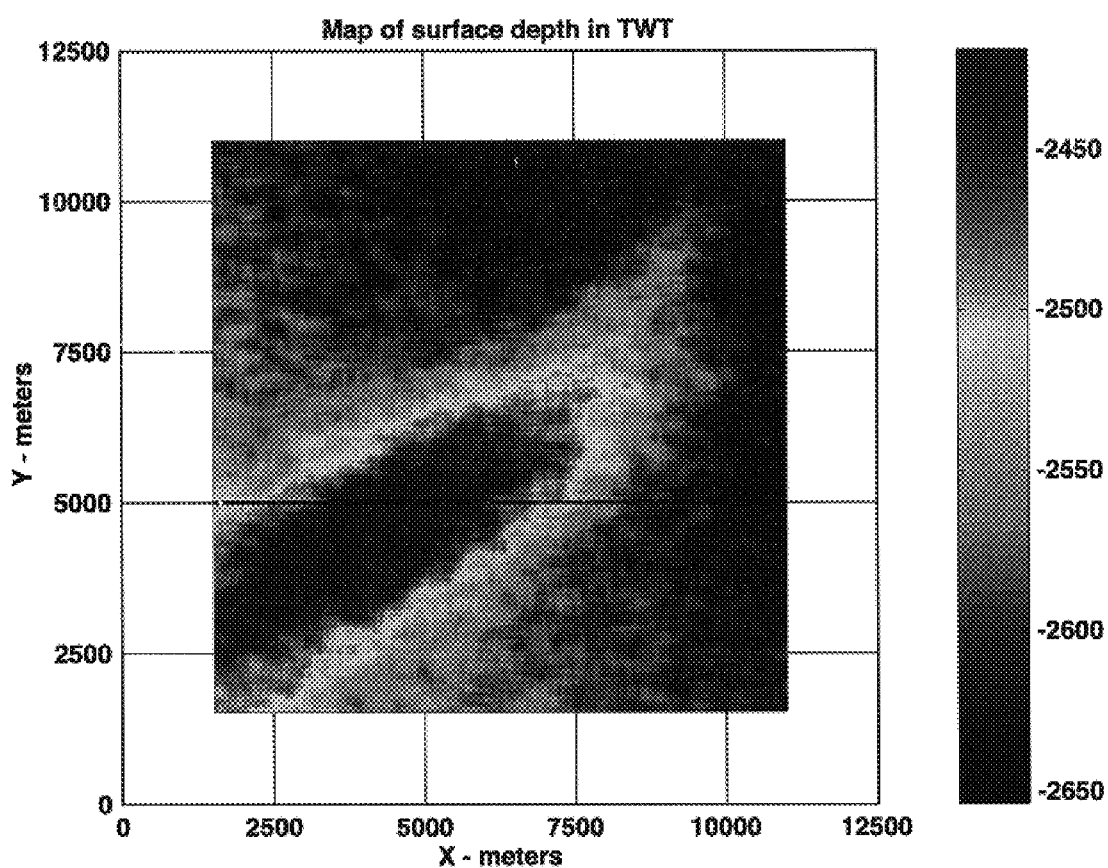
FIG. 4 is a structure map of a synthetic anticline structure.
Figure 6B:
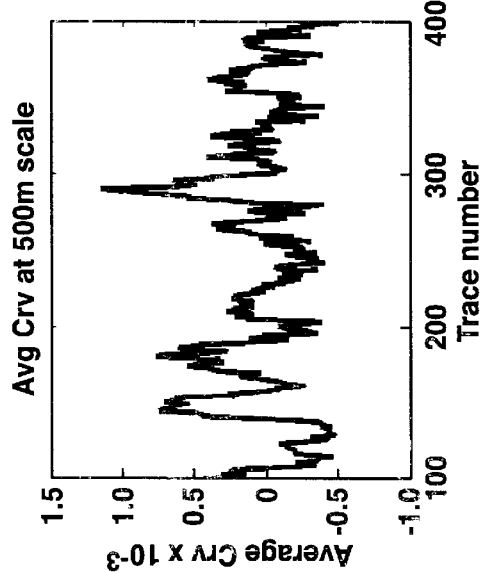
FIGS. 6(a)–6(d) are as in FIGS. 5(a)–5(d), but for increasing window sizes.
Figure 6D:
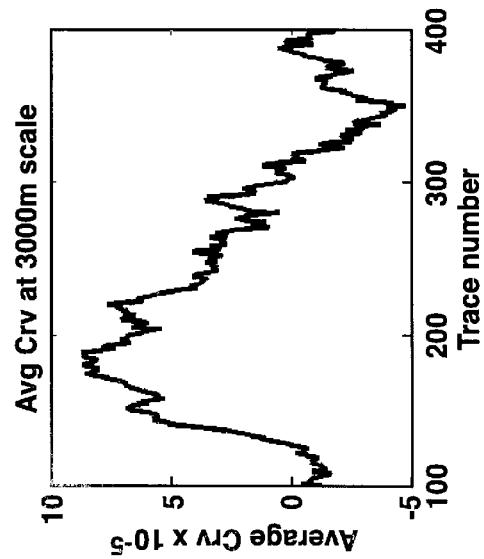
Figure 6A:
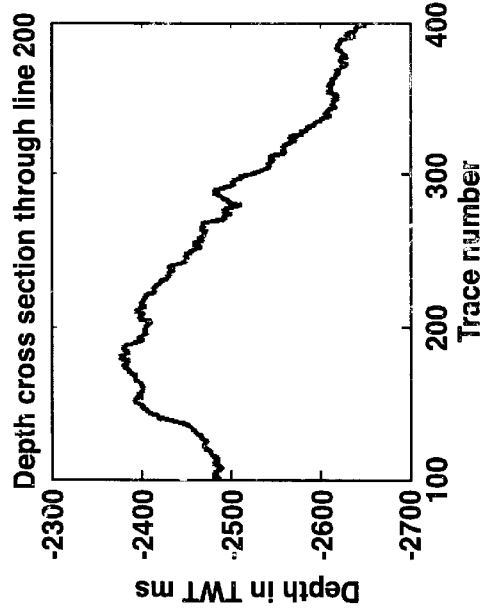
Figure 6C:
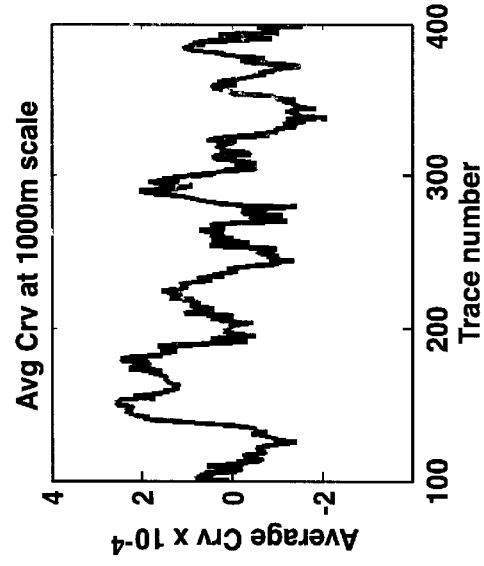
Figure 7A:
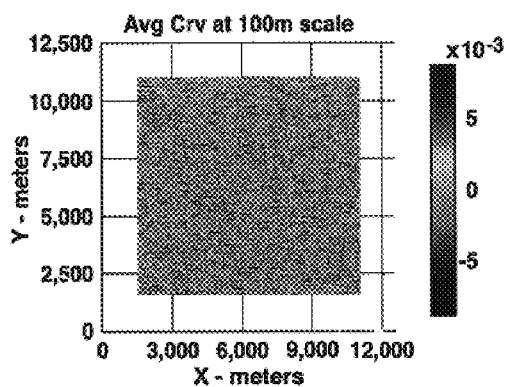
FIGS. 7(a)–7(d) show average curvature maps of the structure map in FIG. 4 for different window sizes.
Figure 7B:
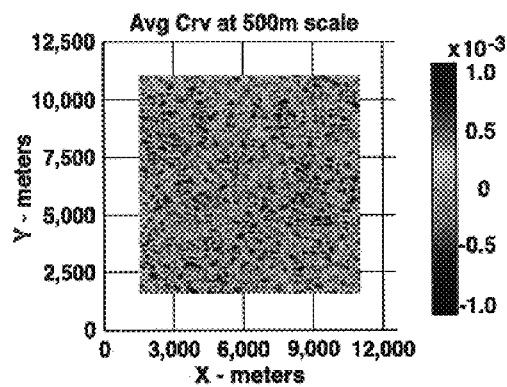
Figure 7C:
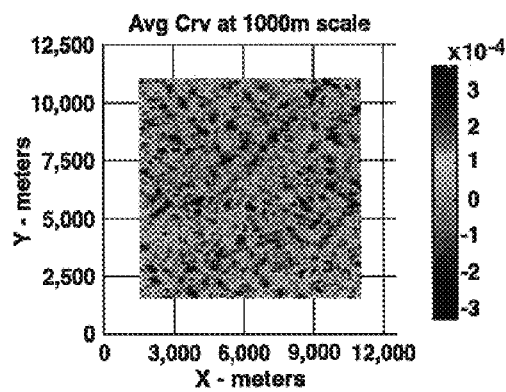
Figure 7D:
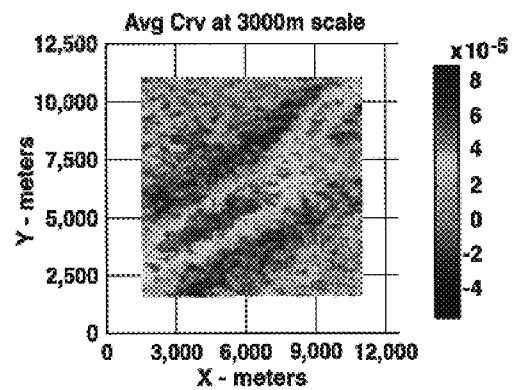
Figure 8A:
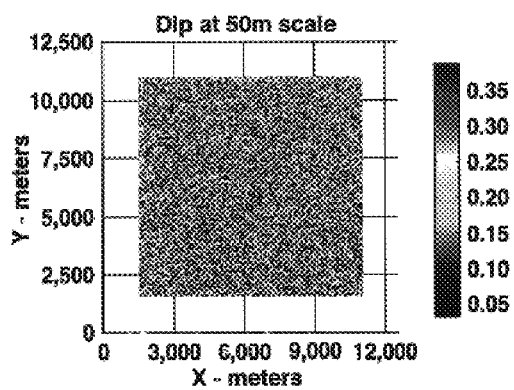
FIGS. 8(a)–8(d) are as in FIGS. 7(a)–7(d), but show dip surface maps.
Figure 8B:
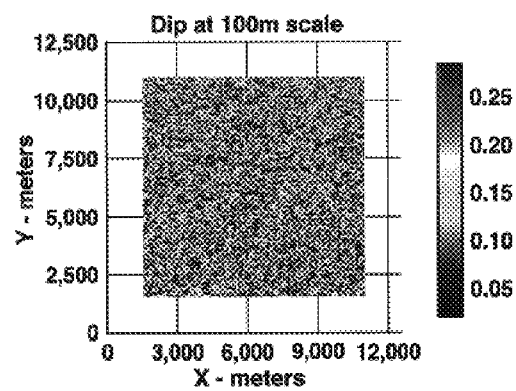
Figure 8C:
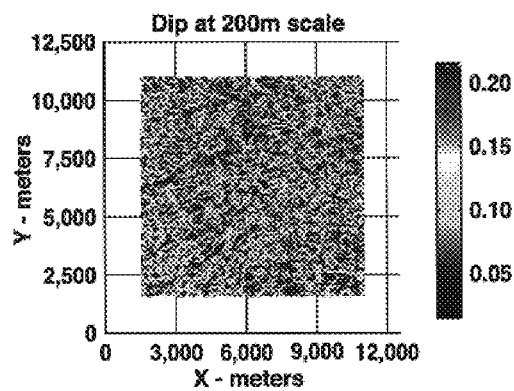
Figure 8D:
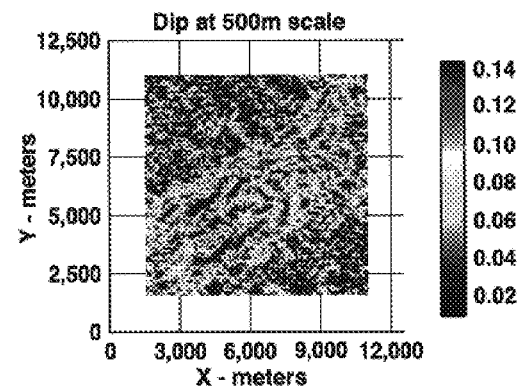

FIG. 4 is a structure map of a synthetic anticline structure. Depth is in ms (seismic two-way time). Gird point spacing is 25 m (82 ft) along both X and Y directions. FIGS. 5(a)–5(d) show a structural cross section through FIG. 4 and the corresponding curvature plots for different window sizes. FIG. 5(a) is a structural cross section through the middle of the structure map in FIG. 4. The cross section is taken horizontally at line 200. FIG. 5(b) shows two-dimensional average curvature calculated according to Eq. (9), then displayed along the same cross section. A 50-m window size is used. No trend is apparent. Two spikes correspond to the largest perturbations in the depth map. For increasing window sizes, FIGS. 5(c) and 5(d) show that a trend begins to emerge. FIGS. 6(a)–6(d) are as in FIGS. 5(a)–5(d), but for ever increasing window sizes. As in FIGS. 2(a)–2(d), increasing window sizes identify the scale of the major features. The optimal imaging scale lies between 1000 m and 1500 m, at which the trend in curvature is clearly visible. The optimal window size is roughly equal to the diameter of the culmination. Notice the reduction of the small-scale noise provided by the technique without any actual manipulation or smoothing of the actual data. If the data were not effected by any noise, then Eqs. (1)–(4) would give the correct result at any scale, apart from edge effects. In the presence of noise, however, the present invention must be used to identify the trends and typical scales in the data.

FIGS. 7(a)–7(d) show Average curvature maps of the structure map in FIG. 4 for different window sizes. The appearance of a large coherent signal for increasingly larger window sizes is noticeable. The focusing effect is clearly evident. Surface curvature is often used to quantify areas of anomalous high strains and the occurrence and intensity of subseismic fractures. Choice of the optimal window width is crucial for imaging the features of interest. Optimal window size is determined by the diameter of the features to be imaged. FIGS. 8(a)–8(d) are as in FIGS. 7(a)–7(d), but show dip surface maps. The optimal window size for the dip map appears to be much smaller. Local trends embedded within a regional trend clearly stand out. For large scales only, the regional trend is highlighted.

Figure 9:
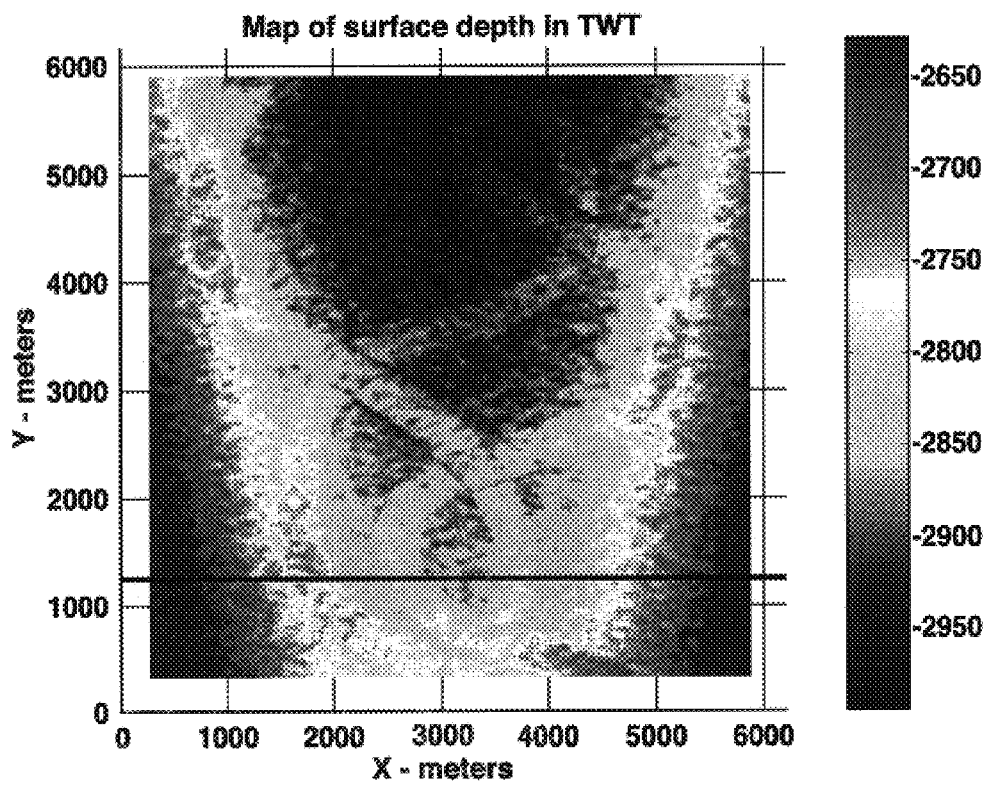
FIG. 9 is a structure map of a synthetic deep-water system with channel mounds.
Figure 10:
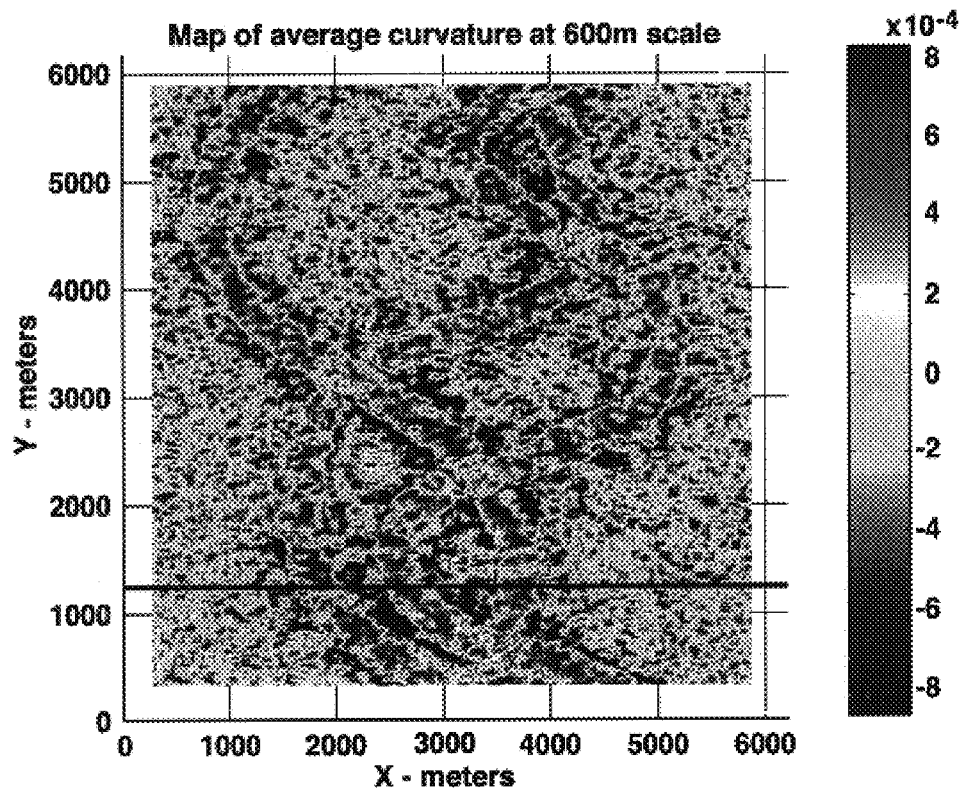
FIG. 10 shows average curvature of the structure of FIG. 9 at an imaging resolution of 600 m.

FIG. 9 is a structure map of a synthetic deep-water system with mounded channels. This will be an example of the application of curvature according to the present invention to a stratigraphic problem. The time structure map is displayed for a deep-water seismic horizon. Grid point spacing is 12.5 m (41 feet) in both directions. FIG. 10 shows average curvature of the structure of FIG. 9 at an imaging resolution of 600 m. Notice the meandering nature of curvature suggestive of a deep-water mounded channel. A random traverse taken through the image reveals the relationship between the subtle mounding and the change in convexity/concavity of curvature.

Figure 11A:
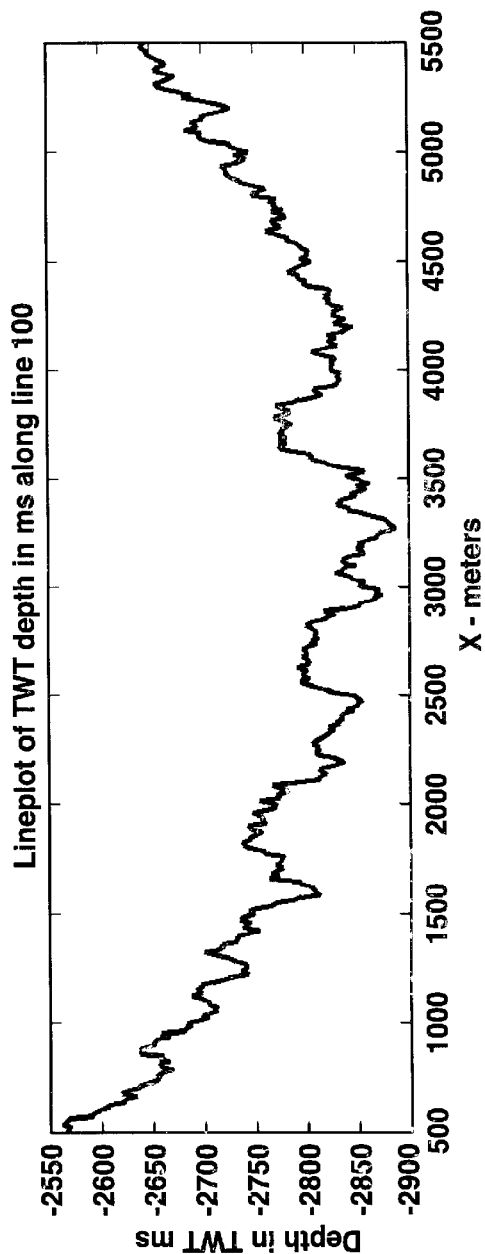
FIGS. 11(a) and 11(b) show cross sections along line 100 in FIG. 9 and FIG. 10, respectively.
Figure 11B:
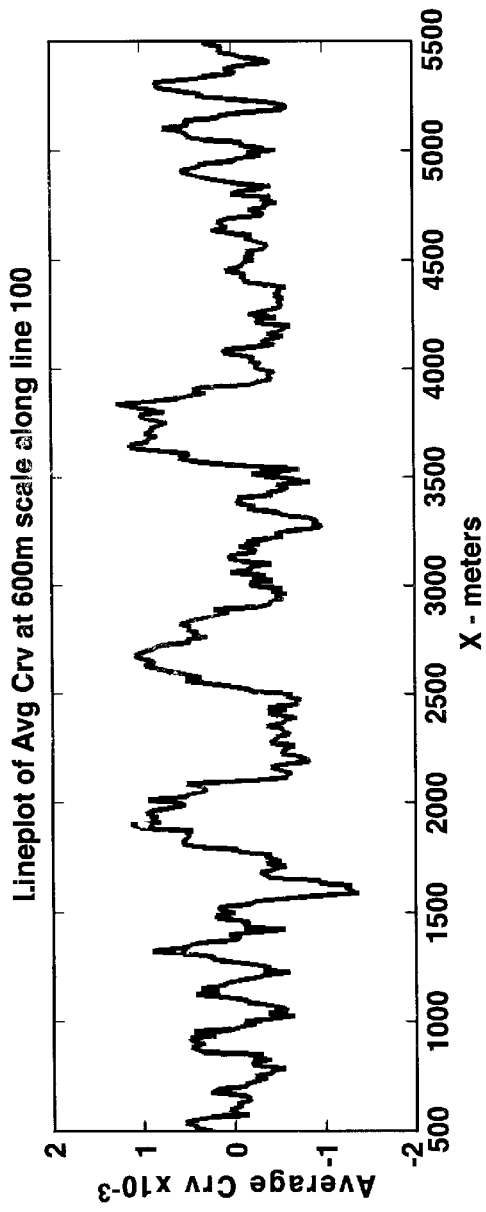
Figure 12A:
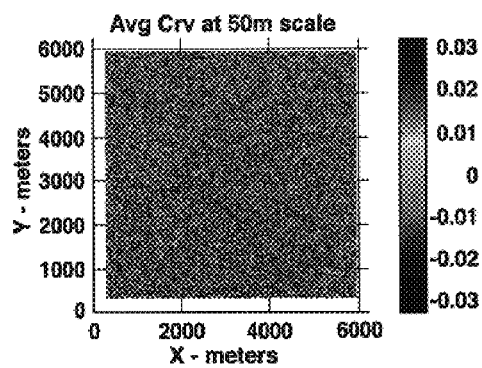
FIGS. 12(a)–12(d) show average curvature maps of the structure map in FIG. 9 for different window sizes.
Figure 12B:
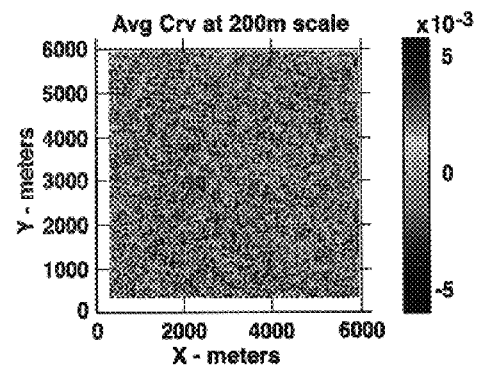
Figure 12C:
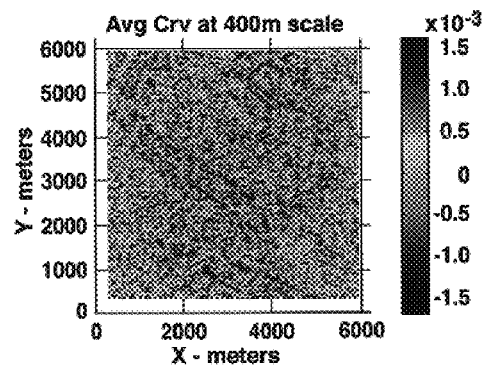
Figure 12D:
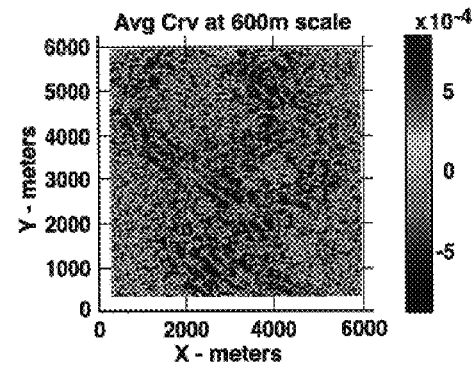

FIGS. 11(a) and 11(b) show cross sections along line 100 in the time structure map of FIG. 9 and in the average curvature map at the 600 m scale of FIG. 10, respectively. The three modeled channel mounds become more visible using the curvature attribute.

FIGS. 12(a)–12(d) show average curvature maps of the structure map in FIG. 9 for different window sizes. These act as sensitivity studies to the selection of the optimal window size. The present invention allows the scanning of various window sizes to bring out the subtle but coherent features in the original time map. As window size increases, coherent features begin to appear and noise is reduced. For sizes larger than an optimal or dominant value, the imaging becomes less sharp.

Several other experiments have been performed, using both synthetic images and actual images of structure maps, depth maps or attribute maps from actual seismic data. The results presented here are typical of what is obtained over a variety of real and realistic conditions.

CONCLUSIONS

The basic manipulations of the grid points provided by the above formulas according to the window definition, allows the calculation of several measures of dip and curvature for any surface, along any direction, and for a wide range of spatial scales. The data will tell what is the most typical or dominant scale at which the dipping and bending of the surface occur. Such scales may be different for the dip than for the curvature, depending on the tectonic or depositional history. The level of subjectivity customarily involved in calculating surface attributes is greatly reduced. Even the principal curvatures along the associated principal axes can be calculated and their azimuths can be determined.

The main factors setting apart the present invention from previously published techniques are:

1) the lack of data manipulation, that is the minimization of subjective steps (i.e., gridding and smoothing passes) in calculating geometric attributes from seismic grids for various spatial scales,
2) the recognition of the interdependencies among the various measures of curvature,
3) a method on how to deal with noisy data in the presence of trends, and
4) the application of such concepts to both structural and stratigraphic problems, for example, those related to moundness or rugosity of a surface.

Now multi-trace geometric attributes of any gridded surface can be calculated objectively at multiple scales. The process is very fast and inexpensive, even for large grids composed of million of grid points. Maps of such attributes from 3-D surveys and coarser 2-D surveys will allow the viewing of the local trends within the context of the regional trends.

The geometric or morphological properties of any surface can be quantified, and the typical spatial scale of its most interesting features can be identified. The optimal scale is determined by the data, namely by the size/width of the geometric features to be resolved. The present invention can identify the degree of faulting, folding, and mounding or rugosity of any surface.

Local and regional trends related to faulting, as in dip and azimuth maps, and folding and mounding, as given by various measures of curvature and the associated principal axes, can now be calculated at a resolution far exceeding what is available in vendor packages. Now the detailed spatial resolution provided by 3-D surveys can be exploited. Calibration of these geometric attributes to petrophysical properties, such as fracture density, and engineering reservoir properties, such as producibility if controlled by faulting and fracturing, can now be attempted and performed quantitatively.

This technique could dramatically effect not only the quality of investigation of geoscience effort but also reduce the effort and interpretation time. Faulting and subtle stratigraphic changes could be quickly investigated by using surfaces that are more easily interpreted. This may reduce the time it takes for interpreters to inspected multiple vertical profiles to track these changes and the hand interpretation it involves.

In addition, the analysis may not be limited to the analysis of structural surfaces and their associated geometrical properties. One may employ this technique to look at the geometrical properties of any seismic attribute over different scales to identify local versus regional effects, but especially to identify the lateral extent of areas of similar attribute values. Areas of relatively constant dip or curvature of an amplitude attribute may be related to seismic facies thus helping to characterize the depositional environment or the extent of the presence of hydrocarbons. Such seismic facies can be determined on the basis of their scale of occurrence rather than depending on the interpretation of a color scale.

It should be understood that the invention is not to be unduly limited to the foregoing which has been set forth for illustrative purposes. Various modifications and alternatives will be apparent to those skilled in the art without departing from the true scope of the invention, as defined in the following claims.

We claim:

1. A method for calculating a multi-trace geometric attribute of a surface at multiple scales, the surface regularly gridded with grid points, comprising the steps of:
   selecting a window size;
   selecting a set of the grid points defining grid cells of the selected window size;
   calculating the geometric attribute using the traces at the set of the grid points;
   repeating selecting and calculating steps for sets of the grid points defining grid cells of different window sizes; and
   determining the window size whose calculations best represent the geometric attribute.

2. The method of claim 1, wherein the geometric attribute is dip.

3. The method of claim 1, wherein the geometric attribute is curvature.

4. The method of claim 2, wherein each grid cell is defined by five grid points.

5. The method of claim 3, wherein each grid cell is defined by nine grid points.

6. The method of claim 1, wherein the different window sizes are integer multiples of the original grid cell size.

7. The method of claim 1, wherein the step of determining window size is accomplished by using a filter with weights assigned to represent the contributions of the selected grid points.

8. The method of claim 7, wherein the filter is an adaptive filter.

* * * * *